United States Patent [19]

Washburn

[11] Patent Number: 5,438,880
[45] Date of Patent: Aug. 8, 1995

[54] ELECTROSTATIC LINEAR AIRSPEED TRANSDUCER

[75] Inventor: S. John Washburn, Jupiter, Fla.

[73] Assignee: United Technologies Corporation, Hartford, Conn.

[21] Appl. No.: 245,210

[22] Filed: May 17, 1994

[51] Int. Cl.⁶ .............................................. G01L 9/12
[52] U.S. Cl. .................................. 73/861.65; 73/718; 73/724
[58] Field of Search ............ 73/861.42, 861.47, 861.48, 73/861.65, 718, 724, 170.08, 170.09, 170.14, 715, 716, 726; 364/558; 361/283.3, 283.4

[56] References Cited

U.S. PATENT DOCUMENTS

| | | | |
|---|---|---|---|
| 2,667,786 | 2/1954 | Spaulding | 73/398 |
| 3,646,811 | 3/1972 | Deleo et al. | 73/182 |
| 3,946,615 | 3/1976 | Hluchan | 73/398 R |
| 4,196,632 | 4/1980 | Sikorra | 73/718 |
| 4,433,580 | 2/1984 | Tward | 73/718 |
| 4,598,381 | 7/1986 | Cucci | 364/558 |
| 4,730,496 | 3/1988 | Knecht et al. | 73/724 |
| 4,829,826 | 5/1989 | Valentin et al. | 73/718 |
| 4,879,627 | 11/1989 | Grantham | 361/283 |
| 4,903,532 | 2/1990 | Tamai et al. | 73/718 |
| 5,042,308 | 8/1991 | Nakamura et al. | 73/718 |
| 5,048,165 | 9/1991 | Cadwell | 29/25.41 |
| 5,056,369 | 10/1991 | Tamai et al. | 73/718 |
| 5,157,973 | 10/1992 | Ciminelli | 73/718 |
| 5,163,326 | 11/1992 | Frick | 73/708 |
| 5,313,830 | 5/1994 | Goode | 73/198 |
| 5,343,756 | 9/1994 | Nakamura et al. | 73/718 |

OTHER PUBLICATIONS

"Micromachined Sensors For Automotive Applications", William Dunn, Motorola Inc., Sensors Sep. 1991, pp. 54–63.
"Interfacial Force Microscopy Gives New Dimension to AFM", by Robert Cassidy, R&D Magazine, Mar. 1994, pp. 25–26.
G. L. Miller et al., "A Rocking Beam Electrostatic Balance For the Measurement of Small Forces", Rev. Sci. Instrum. 62(3), Mar. 1991, pp. 705–709.
Z. Djuric et al., "Experimental Determination of Silicon Pressure Sensor Diaphragm Deflection", Sensors and Actuators A, 24 (1990), pp. 175–179.
M. H. Kwon and R. D. Peters, "Measurement of Electrical Forces Using a Modified Torsion Balance and Capacitance Transducer", Rev. Sci. Instrum. 62(3), Mar. 1991, pp. 716–719.
S. A. Joyce and J. E. Houston, "A New Force Sensor Incorporating Force-Feedback Control For Interfacial Force Microscopy", Rev. Sci. Instrum. 62(3), Mar. 1991, pp. 710–714.

Primary Examiner—Hezron E. Williams
Assistant Examiner—Richard A. Moller
Attorney, Agent, or Firm—Richard H. Kosakowski; Holland & Associates

[57] ABSTRACT

An improved airspeed transducer for rotorcraft is disclosed having a pitot tube connected with a differential capacitive pressure sensor. The pressure differential from the pitot tube is a function of the airspeed squared. A diaphragm in the capacitive pressure sensor deflects when the dynamic pressure exceeds the static pressure from the pitot tube. This diaphragm deflection is sensed by electronics which provides an electrostatic attractive force between the diaphragm and a fixed plate such that the diaphragm is brought back to an undeflected, "at rest" position. The electrostatic force between the diaphragm and fixed plate is a function of the square of the voltage applied to the plate that creates this electrostatic force. Since the pressure differential from the pitot tube varies with the airspeed squared, the relationship between airspeed and feedback voltage is linear. Thus, the feedback voltage is a direct indication of sensed airspeed.

17 Claims, 2 Drawing Sheets

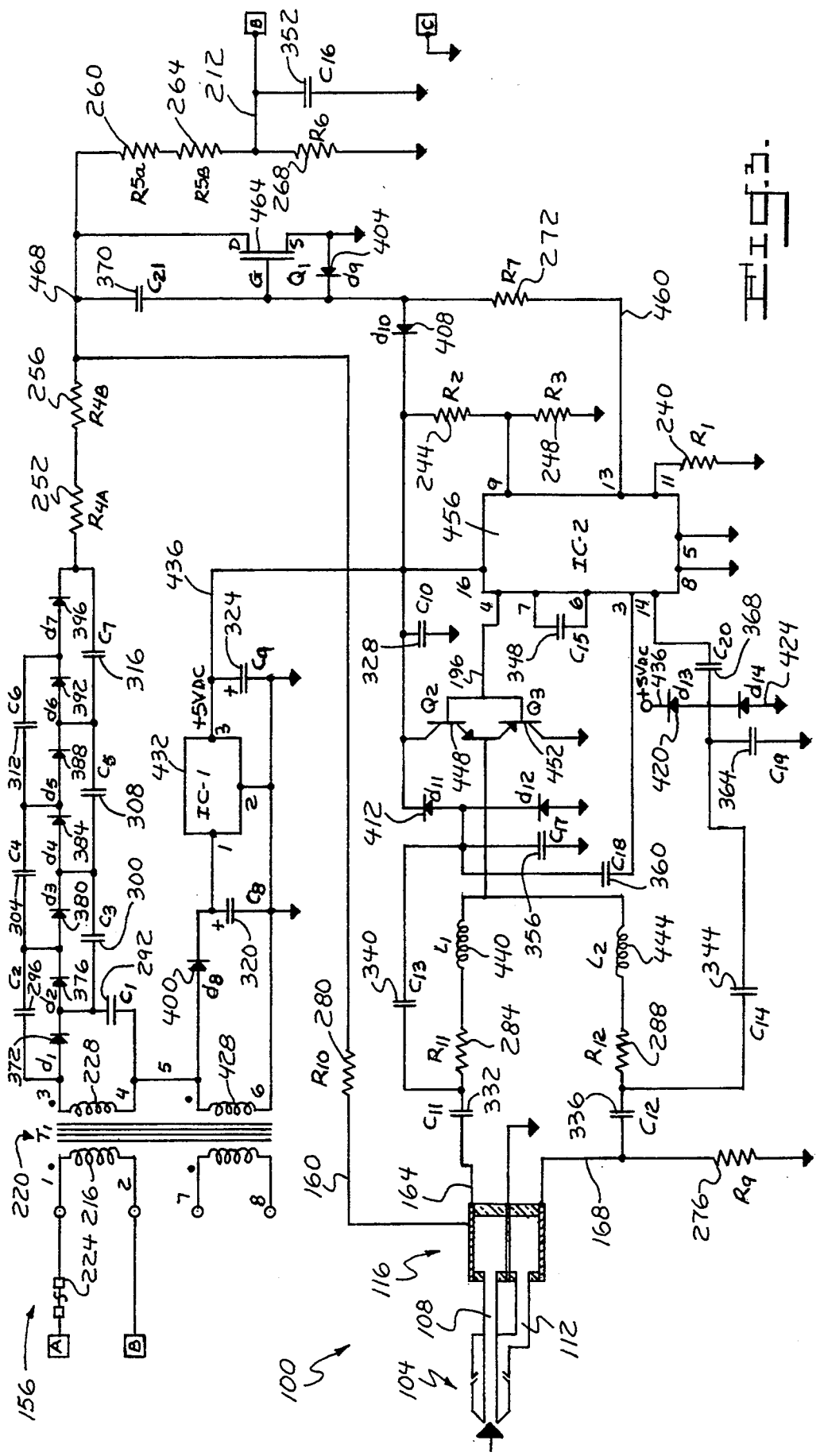

ELECTROSTATIC LINEAR AIRSPEED TRANSDUCER

BACKGROUND OF THE INVENTION

This invention relates to airspeed transducers, and more particularly, to an airspeed transducer having a pitot tube that inherently provides a non-linear (squared) pressure indication of airspeed, in combination with a capacitive pressure sensor and an electrostatic force-feedback system to provide a resulting linear voltage indication of airspeed.

Airspeed is typically measured on an aircraft by a pitot tube sensor that is usually located at the nose of the aircraft or on other forward surfaces. On rotorcraft, the pitot tube may be mounted near the nose of the craft or stationary at the center of the main rotor shaft. Regardless of its location, the pitot tube is generally required to operate over a wide dynamic range of airspeeds; for example, from 0 to 200 knots. If the airspeed measuring system is designed for a 200-knot maximum airspeed, the dynamic range of prior art pitot tube pressure sensing systems is practically limited to speeds above 30 knots. This is usually not a problem for fixed-wing aircraft, because at airspeeds less than 30 knots, they are unable to fly due to loss of lift.

However, the inability to accurately measure airspeeds under 30 knots is a problem for rotorcraft. This is because helicopters perform many useful in-flight functions at less than 30 knots. Yet, helicopters usually also require airspeed indication out to 200 knots. Thus they have larger airspeed dynamic range sensitivity requirements compared to fixed-wing aircraft.

The use of a pitot tube to measure airspeed is further complicated by the fact that the pressure output of the pitot tube is a squared function of airspeed. That is, the pitot tube typically comprises two pneumatic lines, one for dynamic airflow and one for static airflow. The pitot tube output is taken as the difference between the pressure of the dynamic airflow and the pressure of the static airflow. This pressure differential is inherently proportional to the square of the speed of the airflow.

The task is then to linearize this squared airspeed using various non-linear means. It is known in the prior art to use non-linear mechanical means such as meter scales and movements. It is also known to use conventional diaphragm-type pressure transducers, which provide an output that is still proportional to airspeed squared, and then follow that with non-linear electronic circuits. For example, it is known to use a capacitive pressure sensor connected to the pitot tube output. A sensor diaphragm deflects according to the static and dynamic airflow pressures, thereby changing the capacitance of the sensor. This changing capacitance is typically processed electronically in an open-loop, non-linear fashion to indicate airspeed. In this case, the overall system linearity is no better than the combination of the linearity of the diaphragm deflection with pressure and the linearity of the signal processing electronics.

Accordingly, it is a primary object of the present invention to provide an airspeed sensor that has improved performance over prior-art designs at low airspeeds.

It is a general object of the present invention to provide a pressure transducer that yields a linear output for airspeed when the input is the pressure output from a pitot tube.

It is another object of the present invention to provide a closed-loop, electrostatic force-feedback system for a capacitive pressure sensor that linearizes a non-linear indication of airspeed from a pitot tube.

It is yet another object of the present invention to provide an airspeed transducer operable over a wide range of airspeeds.

It is still another object of the present invention to provide an airspeed sensor utilizing a differential capacitive pressure sensor that acts as both a displacement sensor for measuring the force on a variable, movable diaphragm of the sensor due to the airspeed, and as a counterbalance to this force by application of an electrostatic force to a fixed plate of the sensor to restore the diaphragm to an undeflected position.

It is yet another object of the present invention to provide an airspeed transducer that has improved sensitivity to relatively low airspeeds.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicant has invented an improved airspeed transducer for rotorcraft. In the preferred embodiment, the transducer includes a pitot tube that has static and dynamic pressure ports. The difference between these pressures is a squared function of airspeed. The transducer also includes a capacitive pressure sensor comprising two outer rigid conductive plates sandwiched around a center movable conductive diaphragm. The diaphragm is separated from each outer plate by a dielectric spacer such that air cavities are created on each side of the diaphragm. A pair of capacitors are formed by this configuration; a first capacitor comprising one of the outer plates and the diaphragm, the second capacitor comprising the other of the outer plates and the diaphragm. The dynamic pressure port is in fluid communication with one of the cavities, while the static pressure port is in fluid communication with the other cavity. Alternatively, layers of solid dielectric material, such as mica, may be disposed between each fixed plate and corresponding cavity to increase the breakdown voltage of the capacitor. This allows operation of the transducer at higher airspeeds.

In operation, when the airspeed dynamic pressure exceeds the static pressure, the diaphragm deflects, which changes the value of each capacitor. The change in capacitance is proportional to the pressure differential from the airspeed sensor, which is proportional to airspeed squared. Signal processing electronics are included that are responsive to this capacitive imbalance and provide a feedback voltage to the fixed plate of the dynamic pressure capacitor. The feedback voltage causes an electrostatic force of attraction between this fixed plate and the diaphragm. The magnitude of the feedback voltage is proportional to the magnitude of the sensed capacitance imbalance. The feedback voltage is set by signal processing electronics to a value that generates an electrostatic force that brings the diaphragm back to an undeflected, "at rest" position.

The present invention is predicated on the fact that the electrostatic attractive force inherently varies with feedback voltage squared. Since the pressure differential varies with the airspeed squared, the relationship between airspeed and feedback voltage is linear. The present invention has the further utility that, since the effective linearization of airspeed takes place in the capacitive pressure sensor at the front end of the system, relatively low airspeeds (i.e., 0 to 30 knots) can be sensed. Also, the linearity of the overall system is not affected by the linearity of the diaphragm deflection or that of the capacitance change.

BRIEF DESCRIPTION OF THE DRAWINGS

FIG. 3 is a detailed schematic diagram of the capacitive pressure sensor and electronics of FIG. 2.

DETAILED DESCRIPTION OF THE PREFERRED EMBODIMENTS

Figure 1:
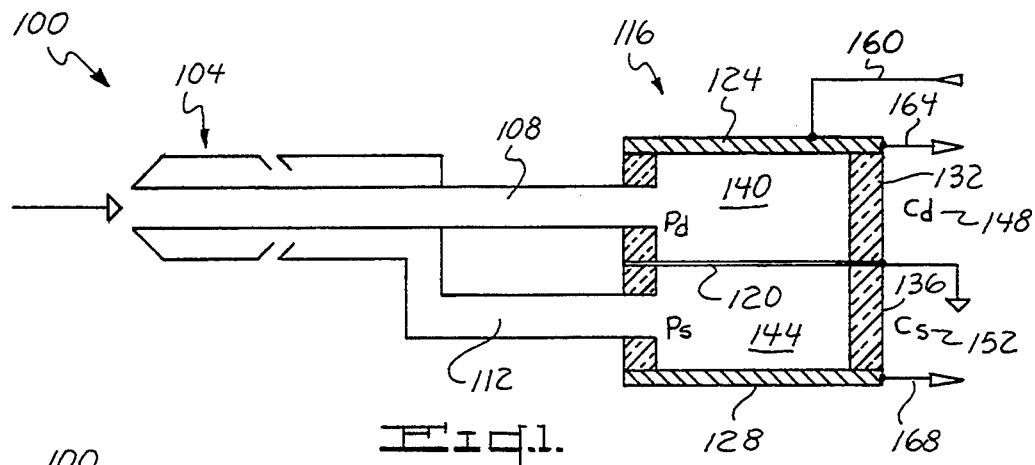
FIG. 1 is an illustration of a pitot tube connected with a differential capacitive pressure sensor, shown in cross-section, according to a preferred embodiment of the present invention.

Referring to the drawings in detail, a preferred embodiment of an electrostatic linear airspeed transducer is illustrated and generally designated by the reference numeral 100. The transducer 100 includes a pitot tube 104, having separate dynamic and static pressure ports 108, 112. A differential capacitive pressure sensor 116 has a center conductive movable diaphragm 120 sandwiched between a pair of outer rigid conductive plates 124, 128. The diaphragm 120 is separated from the plates 124, 128 by corresponding insulative spacers 132, 136 that result in corresponding cavities 140, 144 being formed between the plates 124, 128 and the diaphragm 120. The dynamic pressure, $P_d$, of the air flow is ported to a first cavity 140, while static pressure, $P_s$, is ported to a second cavity 144. The diaphragm 120, together with each of the two outer plates 124, 128, form associated capacitors $C_d$ 148 and $C_s$ 152, respectively. When the dynamic air flow pressure exceeds the static air flow pressure, the diaphragm 120 is movable in a direction that both decreases the value of one of the capacitors, $C_d$ 148, and increases the value of the second capacitor, $C_s$ 152. This capacitance change is sensed by electronic circuitry 156 that places a voltage on one of the rigid plates 124. This establishes an electrostatic attractive force between that rigid plate 124 and the diaphragm 120 such that the diaphragm 120 is returned to its undeflected, "at rest" position. The amount of voltage applied to this plate 124 is a linear indication of airspeed sensed by the pitot tube 104.

Referring now to FIG. 1, there illustrated is a commercially available pitot tube 104 that senses the pressure of a fluid, such as air. In a preferred embodiment of the present invention, the pitot tube 104 is used on a rotorcraft at various locations. The pitot tube 104 senses the dynamic or changing value of the pressure of the air flow and provides this dynamic pressure on a first pneumatic line 108. The pitot tube 104 also senses the static air pressure of the air flow and provides this static pressure on a second pneumatic line 112. The dynamic pressure pneumatic line 108 is connected to a first cavity 140 of a capacitive pressure sensor 116. The static pressure pneumatic line 112 is connected to a second cavity 144 of the capacitive pressure sensor 116. The pitot tube 104 may be disposed at various forward surfaces on the rotorcraft, such as the nose or stationary above the main rotor hub. On the other hand, the capacitive pressure sensor 116 may be part of electronic control circuitry located in the cockpit of the rotorcraft. However, it is to be understood that these locations are purely exemplary and form no part of the present invention.

The output of the pitot tube 104 is expressed as the difference between the dynamic and static pressures as a function of the square of the velocity of the air flow. This relationship is given as follows:

$$P_d - P_s = \tfrac{1}{2} \rho V^2 \qquad (Eq.\ 1)$$

where $P_d$ is the dynamic or changing pressure provided by the pitot tube 104; $P_s$ is the static pressure provided by the pitot tube 104; V is the velocity of the air flow; and $\rho$ is the density of air.

FIG. 1 also illustrates a cross section of the capacitive pressure sensor 116 of the present invention. The sensor 116 comprises an electrically-conductive, flexible diaphragm 120 connected to electrical ground. The diaphragm 120 may comprise a thin piece of steel or other conductive material, or the diaphragm 120 may comprise a thin piece of insulative material, such as mylar, coated with conductive material such as aluminum on one or both sides of the diaphragm 120. On each side of the diaphragm 120 is disposed an insulative or dielectric spacer 132, 136 comprised of, e.g., glass, such as a borosilicate glass. One side of each spacer 132, 136 has a port hole formed therein for connection to the corresponding pneumatic lines 108, 112 from the pitot tube 104 carrying dynamic and static pressures. The sensor 116 also comprises a pair of rigid, electrically-conductive plates 124, 128 attached to the spacers 132, 136. The plates 124, 128 may comprise steel, aluminum or other conductive material. The arrangement of the diaphragm 120, spacers 132, 136 and plates 124, 128 is such that a first cavity 140 is formed bounded by the diaphragm 120, a first spacer 132, and a first one of the plates 124. The first cavity 140 has input to it air flow from the pitot tube 104 that has a dynamic or changing pressure value. A second cavity 144 is formed bounded by the diaphragm 120, the second spacer 136 and the second plate 128, and is connected to the pitot tube 104 such that the air flow with an unchanging or static pressure is vented into this second cavity 144. The two conductive plates 124, 128 have appropriate electrical connections for signal lines 160, 164, 168 that are provided to/from electronic circuitry 156, described in detail hereinafter.

In operation of the pitot tube 104 with the capacitive pressure sensor 116 of the present invention, the diaphragm 120 will be in an undeflected, or "at rest" position, when the dynamic pressure of the air flow vented into the first cavity 140 equals the static pressure of the air flow vented into the second cavity 144. In this position, the capacitance of a capacitor, $C_d$ 148, formed by the first plate 124 and the diaphragm 120 will equal the capacitance value of a second capacitor, $C_s$ 152, formed by the diaphragm 120 and the second plate 128. In contrast, when the dynamic pressure is greater than the static pressure, the diaphragm 120 will deflect downward under the load of this differential pressure. In this situation, the spacing between the center of the diaphragm 120 and the upper plate 124 increases, thereby decreasing the value of the capacitor $C_d$ 148. Further, the spacing between the center of the diaphragm 120 and the bottom plate 128 decreases, thereby increasing the value of the capacitor $C_s$ 152. This is derived from the known physical property that the capacitance of a parallel plate capacitor is proportional to the area of the plates divided by the distance between the plates, as given by the following formula:

$$C = \epsilon A/X \qquad (Eq.\ 2)$$

Where $\epsilon$ is the permitivity of free space, A is the area of the plates, and X is the distance or separation between the plates.

Figure 2:
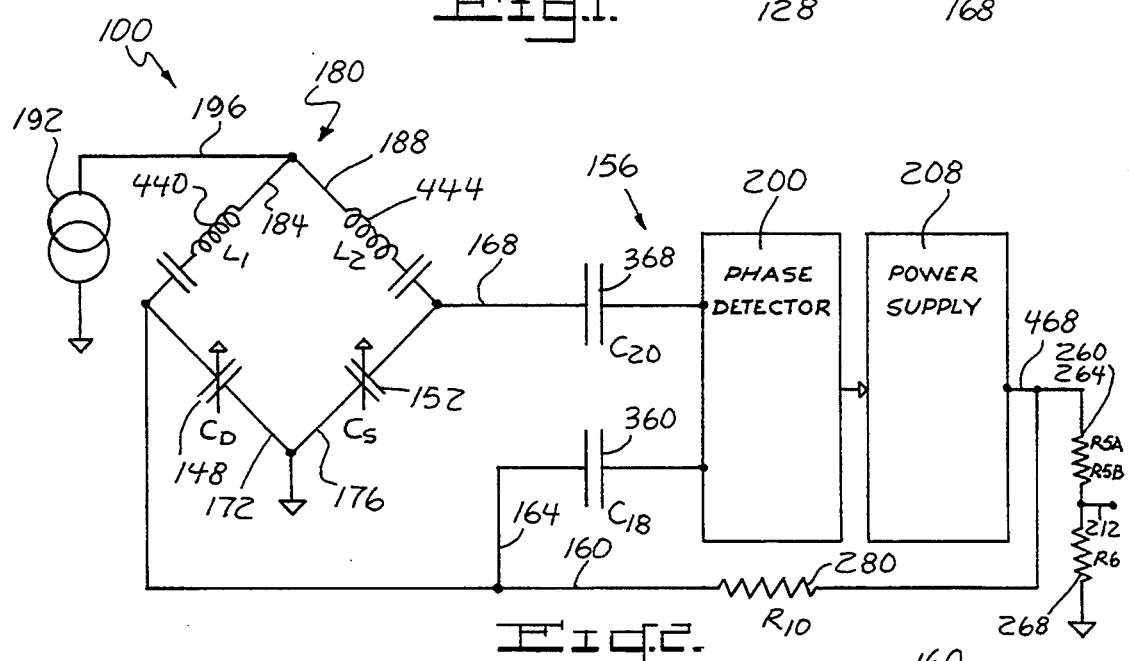
FIG. 2 is a simplified schematic illustration of the capacitive pressure sensor of FIG. 1 together with signal processing electronics that comprise the electrostatic force-feedback system of the present invention.

Referring now to FIG. 2, illustrated in simplified form is the connection of the two capacitors 148, 152 of the capacitive pressure sensor 116 together with additional electronic components. Each of the capacitors, $C_d$ 148 and $C_s$ 152, is shown as a variable capacitor to indicate that these capacitance values vary inversely with diaphragm deflection. Each capacitor 148, 152 is connected as one leg 172, 176 of a four-legged impedance bridge 180. The connection point between the two variable capacitors 148, 152 is connected to ground to indicate the grounded connection of the diaphragm 120. The remaining two legs 184, 188 of the impedance bridge 180 each contains one or more reactive components, e.g., a capacitor and/or an inductor. An oscillator 192 provides a time-varying signal 196 to a point on the impedance bridge 180 that is directly opposite the grounded diaphragm connection. The frequency of the oscillator signal is typically set at the resonant frequency of the reactive components in the legs of the bridge. This insures a relatively large phase shift output from the bridge for corresponding small bridge unbalances due to pressure. The remaining two connection points of the bridge 180 represent the electrical connections 164, 168 to the two rigid plates 124, 128 of the capacitive pressure sensor 116 of FIG. 1. These connection points also represent the output signals of the bridge on the lines 164, 168.

It should be understood that this bridge 180 configuration is merely one example of a circuit used to detect a change in capacitance between the two sensor capacitors, $C_d$ 148 and $C_s$ 152. Other configurations may be employed. A bridge 180 is described in connection with a preferred embodiment of the present invention because it provides excellent sensitivity to relatively small changes in capacitance.

In operation, when the bridge 180 is excited by the time-varying oscillator signal 196, the two time-varying output signals of the bridge 180 on the lines 164, 168 are in phase with one another if the dynamic pressure of the air flow output of the pitot tube 104 equals the static pressure. On the other hand, if the two pressures are unequal, then the corresponding capacitances are also proportionally unequal. In this case, the two output signals 164, 168 of the bridge 180 will now be out of phase such that one signal will phase-lead the other signal. The two bridge output signals on the lines 164, 168 are fed through corresponding capacitors, C18 and C20, to a phase detector 200. The phase detector 200 senses any phase shift between the two bridge output signals 164, 168 and adjusts the voltage output that is provided to a power supply 208. In the preferred embodiment, the power supply 208 provides a D.C. voltage on a line 160 through a resistor R10 to the rigid upper plate 124 of the dynamic pressure capacitor, $C_d$ 148, of the capacitive pressure sensor 116. Note, however, that the voltage may instead comprise a time-varying, alternating-current ("A.C.") voltage. This voltage creates an electrostatic force of attraction between the rigid plate 124 and the movable diaphragm 120 in a direction that causes the diaphragm 120 to return to its undeflected, "at rest" position The magnitude of the voltage is adjusted in accordance with the amount of phase shift sensed between the two output signals 164, 168. This feedback voltage is also provided as an output of the electronic circuitry 156 on a line 212 at the output of a resistor divider network.

The configuration of FIG. 2 is such that the feedback voltage from the power supply 208 applied to the fixed plate 124 is a linear function of airspeed. This is because the electrostatic attractive force between the fixed plate 124 and the diaphragm 120 is proportional to the feedback voltage squared. Thus, this squared feedback voltage is proportional to the airspeed squared. This relationship can be seen from the following analysis.

The force of attraction, between the plates of a parallel plate capacitor when a voltage is applied to the plates is given by the following:

$$F_A = (0.996 * 10^{-12})(A \cdot E^2/X^2) \qquad (Eq.\ 3)$$

where E is the voltage applied between the plates, A is the area of the plates, X is the distance between the plates, and $F_A$ is the force of attraction between the plates.

Further, the force on the diaphragm 120 generated by moving the pitot tube 104 through air at a velocity, V, is given by the following:

$$F_s = (2.349 * 10^{-5})(A)(V^2) \qquad (Eq.\ 4)$$

where A is the area of the diaphragm 120, V is the airspeed, and $F_s$ is the force on the diaphragm 120.

The electronic circuitry 156 represents a servo closed-loop control system that automatically adjusts the feedback voltage as required to maintain the diaphragm 120 in its undeflected position as the pressure applied to the diaphragm 120 varies. The transfer function of the entire system is determined by setting the pressure on the diaphragm 120 due to the electrostatic force equal to the pressure on the diaphragm 120 due to the pitot tube output. Thus, Equation 3 above can be set equal to Equation 4 above and solved for volts per knots and given by the following:

$$E/V = (4856.4)(X) \qquad (Eq.\ 5)$$

Note that the area term cancelled out of Equation 5 and the voltage per knot of airspeed is dependent only on the separation between the diaphragm 120 and the fixed plate 124. Also, from Equation 5 it can be seen that the voltage output on the line 212 that is also fed back on the line 164 to the fixed plate 124 is linearly proportional to airspeed. Thus, the arrangement of FIG. 2 provides a relatively simple means for "linearizing" the squared function of airspeed output from the pitot tube 104.

Referring now to FIG. 3, there illustrated is a more detailed schematic diagram of the connection of the pitot tube 104 and capacitive pressure sensor 116 of FIG. 1 to the electronic circuitry 156 of FIG. 2. The circuitry of FIG. 3 has input thereto A.C. power in the form of a 115 V, A.C. voltage signal at 400 Hz. The input power is applied to an input coil 216 of a transformer, T1 220. One of the input lines is fused with, e.g., a 0.5 amp fuse 224. The transformer, T1 220, may comprise the Model LD420 provided by Stancor. The upper output winding 228 of the transformer 220 provides an A.C. voltage that is transformed into a high voltage D.C. supply by capacitors C1–C7 292–316 and by diodes D1–D7 372–396. The high voltage, low current power supply provides a voltage of approximately 800 V D.C. at the connection of diode D7, 396 capacitor C7 316 and resistor R4A 252. The values for all of the resistors and capacitors in the circuitry of FIG. 3, along with associated reference numbers, are given in Tables I and II, respectively.

TABLE I

| Reference # | RESISTOR # | Resistor Value (ohms) |
| --- | --- | --- |
| 240 | R1 | 12K |
| 244 | R2 | 10k |
| 248 | R3 | 10k |
| 252 | R4A | 470K |
| 256 | R4B | 470K |
| 260 | R5A | 20M |
| 264 | R5B | 20M |
| 268 | R6 | 5K |
| 272 | R7 | 11M |
| 276 | R9 | 1M |
| 280 | R10 | 1M |
| 284 | R11 | 30 |
| 288 | R12 | 30 |

TABLE II

| Reference # | Capacitor # | Capacitor Value (Farads-F) |
| --- | --- | --- |
| 292 | C1 | 0.1 uF |
| 296 | C2 | 0.02 uF |
| 300 | C3 | 0.02 uF |
| 304 | C4 | 0.02 uF |
| 308 | C5 | 0.02 uF |
| 312 | C6 | 0.02 uF |
| 316 | C7 | 0.02 uF |
| 320 | C8 | 82 uF |
| 324 | C9 | 8.2 uF |
| 328 | C10 | 0.1 uF |
| 332 | C11 | 680 pF |
| 336 | C12 | 300 pF |
| 340 | C13 | 680 pF |
| 344 | C14 | 680 pF |
| 348 | C15 | 470 pF |
| 352 | C16 | 0.1 uF |
| 356 | C17 | 0.001 uF |
| 360 | C18 | 680 pF |
| 364 | C19 | 0.001 uF |
| 368 | C20 | 680 pF |

Diodes D1–D8 372–400 may comprise the Model 1N4007, while diodes D9–D14 404–424 may comprise the Model 1N914, all commercially available.

A second output winding 428 of the transformer T1 220, is rectified by diode D8 400, filtered by capacitor C8 320, and fed to a +5 V D.C. voltage regulator 432, IC-1, that may comprise the Model 78M05CT, commercially available. The output of the regulator 432 on the line 436 is filtered by a capacitor C9 324 and is fed to various locations in the electronic circuitry 156 of FIG. 3.

FIG. 3 also illustrates the upper fixed plate 124 of the capacitive pressure sensor 116 connected through a series connection of a capacitor, C11 332, a resistor, R11 284, and an inductor, L1 440. The bottom fixed plate 128 of the sensor 116 is connected in a series connection of C12 336, R12 288, and L2 444. The two inductors 440, 444 each have an exemplary value of 120 microhenries. The two inductors 440, 444 are connected together at one end thereof and also connected to a pair of transistors, Q2 448 and Q3 452, connected between +5 V D.C. and ground in a push-pull arrangement.

Q2 448 may comprise the Model MPS 4123 NPN transistor, while Q3 452 may comprise the Model MPS 4125 PNP transistor, both commercially available. The input to the bases of the two transistors 448, 452 is the time-varying signal 196 from an oscillator 192. The oscillator 192 is comprised of a portion of an integrated circuit 456, IC-2, which may comprise the Model 74HCT4046AE, commercially available. The signal 164 from the upper fixed plate 124 of the capacitive pressure sensor 116 is fed through a diode clamping network and capacitors to an input, pin 3, of IC-2. The signal input to pin 3 of IC-2 456 represents the value of the dynamic pressure capacitor, $C_d$ 148. Also, the signal 168 from the lower fixed plate 128 of the capacitive pressure sensor 456, 116 is fed through the diode clamping network and capacitors to a second input, pin 14, of IC-2 456. The signal input to pin 14 of IC-2 456 represents the value of the static pressure capacitor, $C_s$ 152.

IC-2 456 also functions as the phase detector 200 and the voltage controlled oscillator 204 of FIG. 2. The output signal of IC-2 456 on the line 460 is representative of any phase shift between the two signals 164, 168 input to IC-2 456 and indicative of any difference between the capacitance values $C_d$ 148 and $C_s$ 152. The output signal of IC-2 456 on the line 460 varies the bias voltage applied to the base of transistor Q1 464. Transistor Q1 464 may comprise Model IRFBF30, a high-voltage transistor available from International Rectifier. The varying bias on the base of transistor Q1 464 controls the amount of the high voltage supply current from the high voltage power supply on the line 468 that is shunted to ground through the transistor 464. The shunted current output adjusts the high voltage power supply output on the line 468 to the value required to provide the proper electrostatic attractive force between the upper plate 124 and diaphragm 120 of the capacitive pressure sensor 116 for the various airspeeds measured by the transducer 100 of the present invention. The output voltage is then applied through a resistor divider network comprised of resistors R5a 260, R5b 264 and R6 268, and filter capacitor C16 352. This voltage is the output of the transducer 100 and is indicative of a linear representation of airspeed. The voltage on the line 468 is also fed back through a resistor, R10 280, on the line 160 to the upper fixed plate 124 of the capacitive pressure sensor 116 to provide the electrostatic attractive force between the upper plate 124 and the diaphragm 120, in accordance with the present invention.

Figure 4:
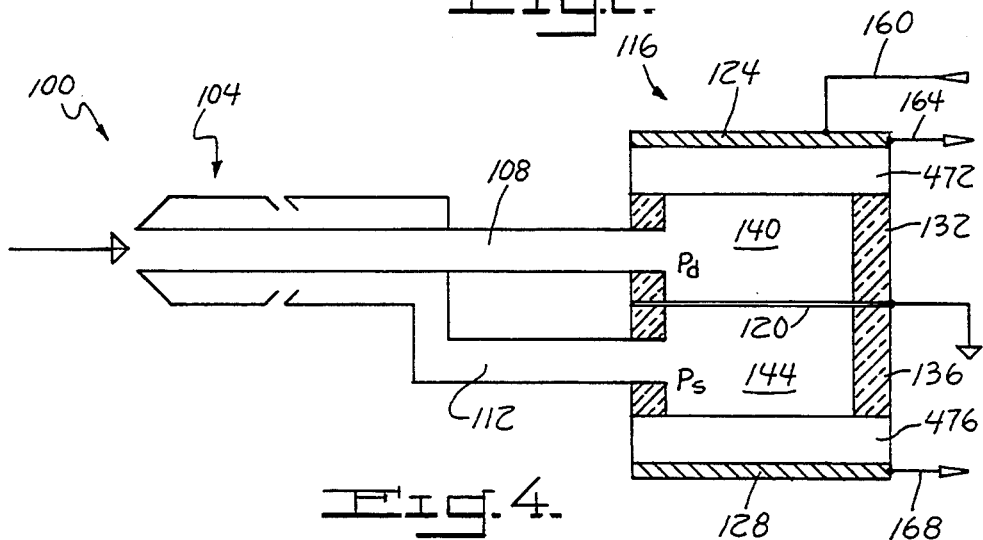
FIG. 4 is an illustration of an alternative embodiment of the capacitive pressure sensor of FIG. 1.

FIG. 4 illustrates an alternative embodiment of the capacitive pressure sensor 116 of FIG. 1. The sensor 116 contains a pair of additional layers 472, 476 of solid dielectric material disposed between the insulative glass spacer 132, 136 and corresponding fixed plate 124, 128. The sensor 116 of FIG. 4 may be used to increase the breakdown voltage between each fixed plate 124, 128 and the diaphragm 120. Also, there may be instances where, given the structure of FIG. 1 wherein there is an air gap between the diaphragm 120 and the corresponding plates 124, 128, transient situations could occur if the pressure variations were faster than what the electronics 156 could follow. Thus, the diaphragm 120 could momentarily bottom out against either the upper or lower fixed plates 124, 128, thereby causing a short circuit to the power supply. In the least, an unacceptable electrical transient could result and the diaphragm 120 might be punctured by the voltage arc or the power supply, or other circuitry in FIG. 3 could be destroyed.

From a practical matter this can be seen from the fact that dry air has a dielectric strength of about 76,000 volts per inch at sea level pressure. Given Equation 5, with a gap between either fixed plate 124, 128 and the diaphragm 120 of 0.001 inches, the maximum possible voltage without occurrence of dielectric breakdown is 76 volts. At 4.856 volts per knot, the dielectric strength of the material would be exceeded at about 15 knots. This would limit the practical upper range of the sensor 116. Thus, the structure of FIG. 4 for the capacitive pressure sensor 116 may be utilized to effectively increase the dielectric strength of the area between either of the fixed plates 124, 128 and the diaphragm 120. In essence, the maximum allowable voltage across the capacitor plates without the occurrence of breakdown is generally increased by the presence of a solid dielectric material. The solid dielectric layers 472, 476 are preferably placed adjacent the fixed plates 124, 128 instead of the diaphragm 120. If placed next to the diaphragm 120, the layers 472, 476 would stiffen the diaphragm 120 and possibly lower the sensitivity of the transducer 100.

The new transfer function of an overall airspeed transducer in accordance with the present invention that utilizes the structure of FIG. 4 is given by the following equation:

$$E/V = (4856.4)(X + D/k)$$
(Eq. 6)

where d is the thickness of the solid dielectric material 472, 476, and k is the dielectric constant of the material. For example, the solid dielectric material 472, 476 may comprise mica, whose dielectric constant equals five, and whose dielectric strength equals one million volts per inch. Thus, the dielectric strength of the mica material is much greater than that of dry air. However, any other dielectric material with a high dielectric strength and also a high dielectric constant, k, is preferred. This has the effect of increasing significantly the point at which "arc-over" will occur. Also, the effective high-end range of the transducer is significantly increased also.

The present invention has been described for use with a system that senses airspeed on a rotorcraft. However, it is to be understood that the preferred embodiment of such a system described herein is purely exemplary. The present invention may be utilized with other systems, such as those found on fixed-wing aircrafts. Also, the present invention may be used with land-based vehicles.

Further, the present invention has been described for use in sensing airspeed. However, the present invention may be utilized with systems for sensing other types of fluids, besides air. Also, the system does not have to be utilized with a pitot tube 104. It can be used with other types of sensors that provide a force that is a function of some parameter. However, as described hereinbefore, the pitot tube 104 provides a squared function of airspeed which must be linearized. The present invention accomplishes this linearization by utilizing the fact that the voltage fed back to the plate 124 to create an electrostatic attractive force between the plate 124 and the diaphragm 120 is such that the voltage is a linear function of airspeed.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. An airspeed transducer, comprising:
   a. a pitot tube operable to sense a velocity of an airflow and to provide a dynamic airflow path and a static airflow path;
   b. a differential capacitive pressure sensor having a centrally-located conductive movable diaphragm disposed between a pair of outer rigid conductive plates, the plates being separated from the diaphragm by corresponding first and second insulative spacers such that a first cavity is formed between the diaphragm and the first plate and a second cavity is formed between the diaphragm and the second plate, the first cavity being in fluid communication with the dynamic airflow path, the second cavity being in fluid communication with the static airflow path, a first capacitor being formed by the diaphragm, the first insulative spacer and the first plate, a second capacitor being formed by the diaphragm, the second insulative spacer and the second plate, the diaphragm being operable to deflect away from an at-rest position when there exists a difference between a pressure of a fluid in the dynamic airflow path and the pressure of a fluid in the static airflow path, the diaphragm deflection being operable to change a capacitance value of each of the first and second capacitors; and
   c. signal processing means, responsive to the capacitance values of each of the first and second capacitors, for determining any difference between the capacitance value of each of the first and second capacitors and for providing a voltage to the first plate of a value that establishes an electrostatic attractive force between the first one of the plates and the diaphragm in an amount that causes the diaphragm to assume the at-rest position, the value of the voltage applied to the first plate being linearly proportional to and indicative of the velocity of an airflow at the pitot tube.

2. The airspeed transducer of claim 1, further comprising a first layer of dielectric material disposed between the first plate and the first insulative spacer, and the second layer of dielectric material disposed between the second plate and the second insulative spacer.

3. The airspeed transducer of claim 2, wherein the first and second layers of dielectric material comprise mica.

4. The airspeed transducer of claim 1, wherein each of the two capacitors is connected as one leg of an impedance bridge, two remaining legs of the bridge containing one or more reactive components, and wherein the signal processing means comprises oscillator means for providing an alternating current signal to the bridge, the bridge providing two time-varying signals that are in phase when the capacitors are of equal value and are out of phase when the capacitors are of unequal value, the signal processing means further comprising means for sensing any out-of-phase condition of the two time-varying signals and for varying the value of the voltage applied to the first plate to bring the two time-varying signals into phase.

5. The airspeed transducer of claim 4, wherein the means for sensing any out-of-phase condition of the two time-varying signals comprises a phase detector that provides a phase signal indicative of the phase relationship between the two time-varying signals, and a power supply for varying the voltage applied to the first plate in proportion to the value of the phase signal.

6. A pressure transducer, comprising:
   a. a capacitive pressure sensor having a conductive diaphragm disposed between first and second conductive plates and separated by first and second dielectric spacers such that corresponding first and second cavities are formed therebetween, the first plate and the diaphragm forming the plates of the first capacitor, the second and the diaphragm forming the plates of a second capacitor, the first cavity having a port into which a fluid having a varying pressure is applied, the second cavity having a port into which a fluid having a constant pressure is applied, a capacitance value of the first capacitor being equal to a capacitance value of the second capacitor when the varying pressure of the fluid equals the constant pressure of the fluid, the diaphragm being in an at-rest position when the varying pressure of the fluid equals the constant pressure of the fluid, the capacitance value of the first capacitor varying inversely with the capacitance value of the second capacitor when the varying pressure of the fluid differs from the constant pressure of the fluid, the diaphragm being deflected from the at-rest position when the pressures are unequal; and
   b. signal processing means, for determining any difference between the capacitance values of the first and second capacitors, and for providing a voltage to the first plate of a value that establishes an electrostatic force between the first plate and the diaphragm in an amount that causes the diaphragm to assume an at-rest position, the value of the voltage applied to the first plate being linearly proportional to and indicative of a squared function of any difference between the constant and varying pressures of the fluid.

7. The pressure transducer of claim 6, further comprising a pitot tube operable to sense a velocity of an airflow and to provide a first airflow path in fluid communication into the port of the first cavity, and to provide a second airflow path in fluid communication into the port of the second cavity.

8. The pressure transducer of claim 7, wherein the value of the voltage applied to the first plate is linearly proportional to and indicative to the velocity of the airflow, the airflow velocity being a squared function of any difference between the constant and varying pressures of the fluid.

9. The pressure transducer of claim 6, further comprising a first layer of dielectric material disposed between the first plate and the first dielectric spacer.

10. The airspeed transducer of claim 9, wherein the first layer of dielectric material comprises mica.

11. The airspeed transducer of claim 6, further comprising a second layer of dielectric material disposed between the second plate and the second dielectric spacer.

12. The pressure transducer of claim 11, wherein the second layer of dielectric material comprises mica.

13. The pressure transducer of claim 6, wherein the voltage provided to the first plate is a direct current voltage.

14. The pressure transducer of claim 6, wherein the voltage applied to the first plate is an alternating current voltage.

15. The pressure transducer of claim 6, wherein each of the two capacitors is connected as one leg of an impedance bridge, two remaining legs of the bridge containing one or more reactive components, and wherein the signal processing means comprises oscillator means for providing an alternating current signal to the bridge, the bridge providing two time-varying signals that are in phase when the capacitors are of equal value and are out of phase when the capacitors are of unequal value, the signal processing means further comprising means for sensing any out-of-phase condition of the two time-varying signals and for varying the value of the voltage applied to the first one of the plates to bring the two time-varying signals into phase.

16. The pressure transducer of claim 15, wherein the means for sensing any out-of-phase condition between the two time-varying signals comprises a phase detector that provides a phase signal indicative of the phase relationship between the two time-varying signals, and a voltage source for providing the voltage to the first plate in proportion to the value of the phase signal.

17. An airspeed transducer, comprising:
   a. a pitot tube operable to sense speed of an airflow to provide a dynamic airflow path indicative of a varying pressure value of the airflow and to provide a static airflow path indicative of a constant pressure value of the airflow, a difference between the varying pressure value and static pressure value of the airflow being a function of the square of the speed of the airflow;
   b. a differential capacitive pressure sensor having a movable diaphragm disposed between a pair of rigid plates, the plate being separated from the diaphragm by corresponding first and second insulative spacers such that a first cavity is formed between the diaphragm and the first plate and a second cavity is formed between the diaphragm and the second plate, the first cavity being in fluid communication with the dynamic airflow path, the second cavity being in fluid communication with the static airflow path, a first capacitor being formed by the diaphragm, the first insulative spacer and the first plate, a second capacitor being formed by the diaphragm, the second insulative spacer and the second plate, the diaphragm being operable to deflect away from an at-rest position when there exists a difference between a pressure of a fluid in the dynamic airflow path and a pressure of a fluid in the static airflow path, the diaphragm deflection being operable to change a capacitive value of each of the first and second capacitors; and
   c. signal processing means, for sensing any difference between the values of the first and second capacitors and for providing a voltage to the first plate having a value proportional to any difference between the values of the first and second capacitors, the voltage establishing an electrostatic attractive force between the first one of the plates and the diaphragm in an amount that causes the diaphragm to return to an at-rest position at which the value of the first capacitor will equal the value of the second capacitor, the value of the voltage applied to the first plate being linearly proportional to and indicative of the speed of the airflow at the pitot tube.

* * * * *